United States Patent
Kranjc et al.

(10) Patent No.: US 12,524,452 B1
(45) Date of Patent: Jan. 13, 2026

(54) SUMMARY OF A DISCUSSED TOPIC IN PREVIOUS CONVERSATIONS AS AN ARTIFACT IN LARGE LANGUAGE MODEL INTERFACES

(71) Applicant: Google LLC, Mountain View, CA (US)

(72) Inventors: Tibor Kranjc, Zurich (CH); Will Walker, Oakland, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/970,876

(22) Filed: Dec. 5, 2024

(51) Int. Cl.
*G06F 16/3349* (2025.01)
*G06F 16/355* (2025.01)

(52) U.S. Cl.
CPC ........ *G06F 16/3349* (2019.01); *G06F 16/355* (2019.01)

(58) Field of Classification Search
CPC ............... G06F 16/3349; G06F 16/355; G06F 16/9535; G06F 40/30; G06F 40/279
USPC ........ 707/706, 709, 731, 740, 771, 999.006, 707/999.005, E17.09
See application file for complete search history.

(56) References Cited

U.S. PATENT DOCUMENTS

| | | | | |
|---|---|---|---|---|
| 2002/0138529 | A1* | 9/2002 | Yang-Stephens ....... | G06F 16/38 707/E17.09 |
| 2006/0195785 | A1 | 8/2006 | Portnoy et al. | |
| 2010/0131498 | A1* | 5/2010 | Linthicum ............ | G06F 16/338 707/E17.046 |
| 2018/0341631 | A1* | 11/2018 | Verma ..................... | G06F 40/30 |
| 2019/0147108 | A1* | 5/2019 | Liu ........................ | G06N 5/041 707/706 |
| 2022/0107972 | A1* | 4/2022 | Fume .................... | G06F 16/345 |

FOREIGN PATENT DOCUMENTS

| | | |
|---|---|---|
| CN | 118070908 A | 5/2024 |
| CN | 118093813 A | 5/2024 |

OTHER PUBLICATIONS

Vertical Serve Blogs "GenAI—Managing context history best practices" Aug. 16, 2024.
Dan Cleary "How to give your chatbot more memory" Oct. 20, 2023.
Vinayak Deshpandey "How to make LLM remember conversation with langchain" Mar. 10, 2024.
"ChatGPT can now 'read aloud' its responses. Here's how the new feature works" Mar. 5, 2024.

* cited by examiner

*Primary Examiner* — Md I Uddin
(74) *Attorney, Agent, or Firm* — Honigman LLP; Brett A. Krueger; Grant Griffith

(57) ABSTRACT

A method includes receiving a first query issued by a user and processing the first query to classify the first query as being related to a particular existing topic that corresponds to a respective one of a plurality of topic summaries stored in a topic summary datastore. Each respective topic summary of the plurality of topic summaries stored in the topic summary datastore corresponds to a different respective topic and is associated with a respective summary of past query-response interactions between a user and an assistant interface that are related to the different respective topic. The method also includes retrieving the respective topic summary from the topic summary datastore that corresponds to the particular existing topic, processing the first query conditioned on the respective topic summary retrieved from the topic summary datastore to generate a first response, and providing presentation content based on the first response for output.

18 Claims, 11 Drawing Sheets

SUMMARY OF A DISCUSSED TOPIC IN PREVIOUS CONVERSATIONS AS AN ARTIFACT IN LARGE LANGUAGE MODEL INTERFACES

TECHNICAL FIELD

This disclosure relates to a summary of a discussed topic in previous conversations as an artifact in large language model interfaces.

BACKGROUND

A user may direct a new user query towards a virtual assistant or interface that enables the user to interact with a large language model, and vaguely remember having one or more previous dialogs (e.g., conversations or chat sessions) with the virtual assistant or the interface that enables the user to interact with the large language model in a similar or related topic. In this case, the user may be able to search through a listing of prior dialogs (e.g., a chat history) to find the one or more previous dialogs similar or related to the topic and continue, in that conversation, with the new user query. The conventional approach for a user to continue from a previous chat session relies on manual review, or search, of the chat history between the user and the virtual assistant or the interface that enables the user to interact with the generative model(s), to identify and access the previous dialog. Unfortunately, when a user recalls a particular topic in a new chat session that is previously discussed in multiple previous chat sessions, the conventional approach could require the user to provide inputs to swipe between and access an entire chat history that may include tens or hundreds of prior chat sessions between the user and the virtual assistant or the interface that enables the user to interact with the large language model. This inconvenience to the user may be further exacerbated when the user is viewing the chat history on a client device with a limited display size or when the client is unable to visually view the chat history.

SUMMARY

One aspect of the disclosure provides a computer-implemented method for classifying a query as being related to a previously discussed topic and generating a response to the query that is conditioned on a topic summary corresponding to the previously discussed topic. The computer-implemented method executing on data processing hardware that causes the data processing hardware to perform operations that include receiving, at an assistant interface, a first query issued by a user, and processing, using a topic classification module of the assistant interface, the first query to classify the first query as being related to a particular existing topic that corresponds to a respective one of a plurality of topic summaries stored in a topic summary datastore. Each respective topic summary of the plurality of topic summaries stored in the topic summary datastore corresponding to a different respective topic and associated with a respective summary of past query-response interactions between the user and the assistant interface that are related to the different respective topic. The operations also include retrieving, using the particular existing topic that the first query is classified as being related to, the respective topic summary from the topic summary datastore that corresponds to the particular existing topic, and processing, using a response generation module of the assistant interface, the first query conditioned on the respective topic summary retrieved from the topic summary datastore to generate a first response to the first query. The operations also include providing, for output from a user device associated with the user, presentation content based on the first response to the first query.

Implementations of the disclosure may include one or more of the following optional features. In some implementations, the operations also include, prior to receiving the first query: receiving, at the assistant interface, a second query issued by the user, the second query specifying an action for the assistant interface to perform on behalf of the user; processing, using the topic classification module, the second query to classify the second query as being related to a new topic not previously discussed in any previous query-response interactions between the user and the assistant interface; processing, using the response generation module, the second query to generate a second response to the second query; processing, using a summary generation module of the assistant interface, the second response to generate a respective topic summary corresponding to the new topic classified by the topic classification module; and storing the respective topic summary corresponding to the new topic classified by the topic classification module in the topic summary datastore. Here, the particular existing topic that the first query is classified as being related to includes a new topic that the second query is classified as being related to, and the respective topic summary retrieved from the topic summary datastore that corresponds to the particular existing topic includes the respective topic summary corresponding to the new topic classified by the topic classification module. In these implementations, the operations may further include determining a name for the new topic that the first query is classified as being related to and providing, for output from the user device, a message informing the user of the name of the new topic and that the assistant interface will store the respective topic summary in the topic summary datastore.

The first query issued by the user may request the assistant interface to recall the respective topic summary that corresponds to the particular existing topic that the first query is classified as being related to. The first response to the first query may include the respective topic summary retrieved from the topic summary datastore. The assistant interface may include one or more large language models (LLMs) or an interface for connecting to one or more LLMs.

In some examples, the first query issued by the user specifies an action for the assistant interface to perform on behalf of the user and the first response to the first query indicates performance of the action specified by the first query. Here, the action is related to the particular existing topic that the first query is classified as being related to. In these examples, operations may further include: processing, using a summary generation module of the assistant interface, the first response and the respective topic summary to generate an updated topic summary corresponding to the particular existing topic that the first query is classified as being related to; and storing the updated topic summary corresponding to the particular existing topic in the topic summary datastore. Storing the updated topic summary may option include storing the first query and the first response as a respective query-response interaction in the topic summary datastore.

In some implementations, the presentation content provided for output from the user device includes or provides access to the past query-response interactions between the user and the assistant interface that are related to the particular existing topic. In some additional implementations, processing, using the topic classification module, the first query to classify the first query as being related to the particular existing topic includes: receiving or accessing a current list of existing topics that correspond to respective ones of the plurality of topic summaries stored in the topic summary datastore; and processing the first query conditioned on the current list of existing topics to classify the first query as being related to the particular existing topic.

Another aspect of the disclosure provides a system for classifying a query as being related to a previously discussed topic and generating a response to the query that is conditioned on a topic summary corresponding to the previously discussed topic. The system includes data processing hardware and memory hardware in communication with the data processing hardware and storing instructions that when executed on the data processing hardware causes the data processing hardware to perform operations that include receiving, at an assistant interface, a first query issued by a user, and processing, using a topic classification module of the assistant interface, the first query to classify the first query as being related to a particular existing topic that corresponds to a respective one of a plurality of topic summaries stored in a topic summary datastore. Each respective topic summary of the plurality of topic summaries stored in the topic summary datastore corresponding to a different respective topic and associated with a respective summary of past query-response interactions between the user and the assistant interface that are related to the different respective topic. The operations also include retrieving, using the particular existing topic that the first query is classified as being related to, the respective topic summary from the topic summary datastore that corresponds to the particular existing topic, and processing, using a response generation module of the assistant interface, the first query conditioned on the respective topic summary retrieved from the topic summary datastore to generate a first response to the first query. The operations also include providing, for output from a user device associated with the user, presentation content based on the first response to the first query.

This aspect may include one or more of the following optional features. In some implementations, the operations also include, prior to receiving the first query: receiving, at the assistant interface, a second query issued by the user, the second query specifying an action for the assistant interface to perform on behalf of the user; processing, using the topic classification module, the second query to classify the second query as being related to a new topic not previously discussed in any previous query-response interactions between the user and the assistant interface; processing, using the response generation module, the second query to generate a second response to the second query; processing, using a summary generation module of the assistant interface, the second response to generate a respective topic summary corresponding to the new topic classified by the topic classification module; and storing the respective topic summary corresponding to the new topic classified by the topic classification module in the topic summary datastore. Here, the particular existing topic that the first query is classified as being related to includes a new topic that the second query is classified as being related to, and the respective topic summary retrieved from the topic summary datastore that corresponds to the particular existing topic includes the respective topic summary corresponding to the new topic classified by the topic classification module. In these implementations, the operations may further include determining a name for the new topic that the first query is classified as being related to and providing, for output from the user device, a message informing the user of the name of the new topic and that the assistant interface will store the respective topic summary in the topic summary datastore.

The first query issued by the user may request the assistant interface to recall the respective topic summary that corresponds to the particular existing topic that the first query is classified as being related to. The first response to the first query may include the respective topic summary retrieved from the topic summary datastore. The assistant interface may include one or more large language models (LLMs) or an interface for connecting to one or more LLMs.

In some examples, the first query issued by the user specifies an action for the assistant interface to perform on behalf of the user and the first response to the first query indicates performance of the action specified by the first query. Here, the action is related to the particular existing topic that the first query is classified as being related to. In these examples, operations may further include: processing, using a summary generation module of the assistant interface, the first response and the respective topic summary to generate an updated topic summary corresponding to the particular existing topic that the first query is classified as being related to; and storing the updated topic summary corresponding to the particular existing topic in the topic summary datastore. Storing the updated topic summary may option include storing the first query and the first response as a respective query-response interaction in the topic summary datastore.

In some implementations, the presentation content provided for output from the user device includes or provides access to the past query-response interactions between the user and the assistant interface that are related to the particular existing topic. In some additional implementations, processing, using the topic classification module, the first query to classify the first query as being related to the particular existing topic includes: receiving or accessing a current list of existing topics that correspond to respective ones of the plurality of topic summaries stored in the topic summary datastore; and processing the first query conditioned on the current list of existing topics to classify the first query as being related to the particular existing topic.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
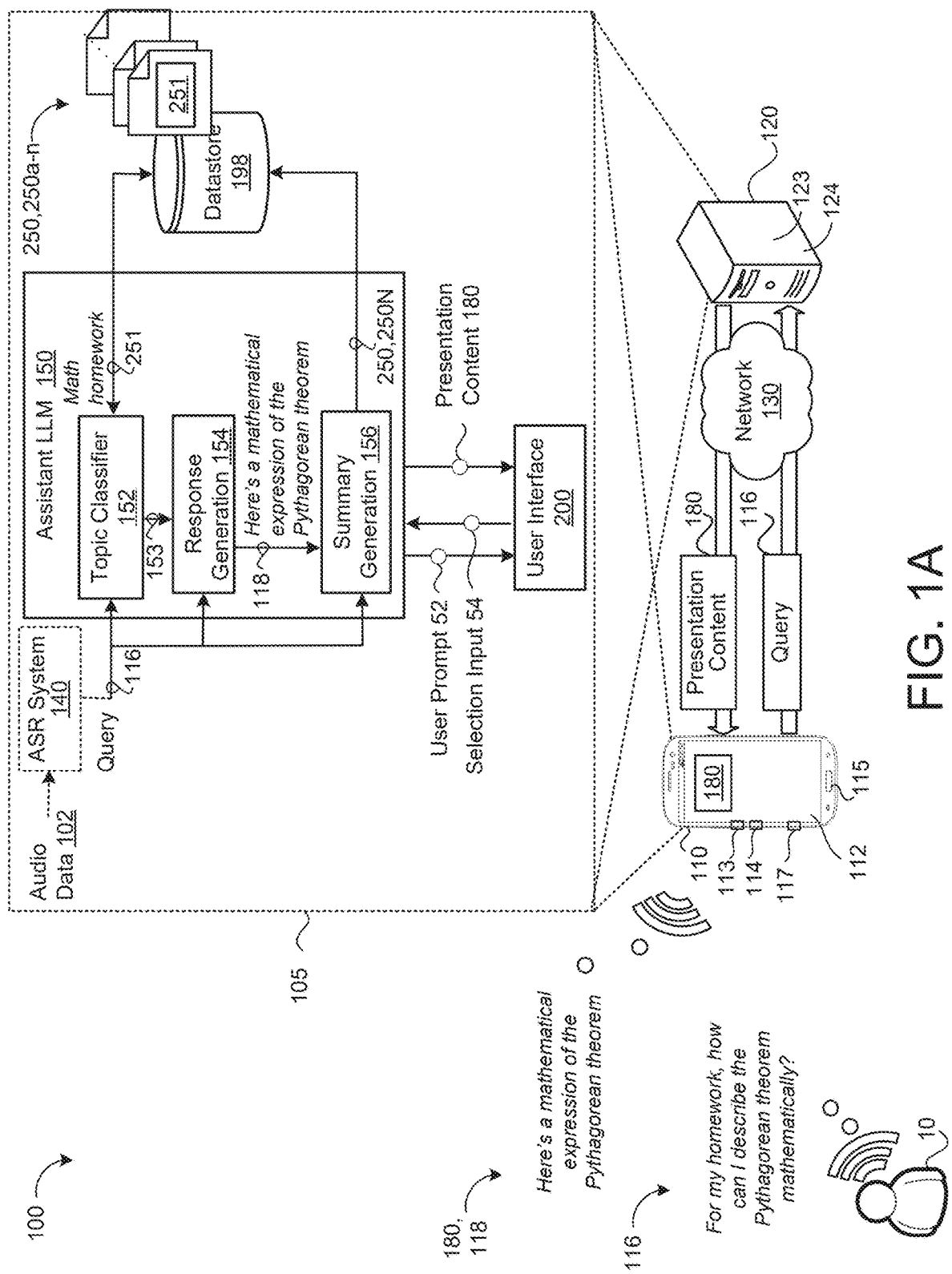
FIGS. 1A and 1B are schematic views of an example topic summary recall (TRS) system for generating, recalling, and updating topic summaries during chat sessions between a user and an assistant interface.

Humans may engage in human-to-computer dialogs with interactive software applications referred to as "chatbots," "voice bots", "virtual assistants", "automated assistants", "interactive personal assistants," "intelligent personal assistants," "conversational agents," etc. via a variety of computing devices. As one example, these chatbots may correspond to a machine learning model or a combination of different machine learning models, and may be utilized to perform various tasks on behalf of users.

Chatbots adopting Large language models (LLMs) are currently opening up a wide range of applications due to their powerful understanding and generation capabilities which can operate over text, image, and/or audio inputs. These models are also being extended with actuation capabilities via integration mechanisms with various service providers.

As a user relies on an assistant LLM (e.g., LLM-powered assistant) for performing tasks on the user's behalf, the prior dialog sessions maintained in a chat history can span a multitude of different topics. Often, when the user directs a new query toward the assistant LLM, the user may vaguely remember having one or more previous dialog sessions with the assistant LLM in a similar or related topic. In this case, the user may be able to search through a listing of previous dialogs (e.g., chat sessions) to find the one or more previous dialogs similar or related to the topic and continue, in that conversation, with the new query. However, when the user recalls a particular topic in a new chat session that is previously discussed in one or more previous dialogs (e.g., chat sessions), the conventional approach requires the user to provide inputs to swipe between and access an entire chat history that may include tens or hundreds of prior chat sessions between the user and the assistant LLM. Stated differently, locating previous chat sessions is not an easy task since the multitude of previous chat sessions includes many topics having titles created from the initial query/prompt such that the topics and associated artifacts get buried within the chat history. As a result, users typically do not know or do not want to undertake the arduous task of revisiting previous chat sessions within their chat history.

To address the inability of assistant LLMs to seamlessly recall prior chat sessions related to particular topics and generate topic summaries for particular topics on the fly, implementations herein are directed toward an assistant LLM leveraging a topic summary recall system to create, identify, and recall topics across multiple chat sessions, as well as generate and update topic summaries based on new user queries and associated responses generated by the assistant LLM. Notably, the topic summary recall system can store a topic summary as an artifact and later recall and append the topic summary to a new query directed toward the assistant LLM that is related to the topic, thereby ensuring continuous learning by enabling the assistant LLM to generate contextually informed responses to queries related to existing topics.

Figure 1B:
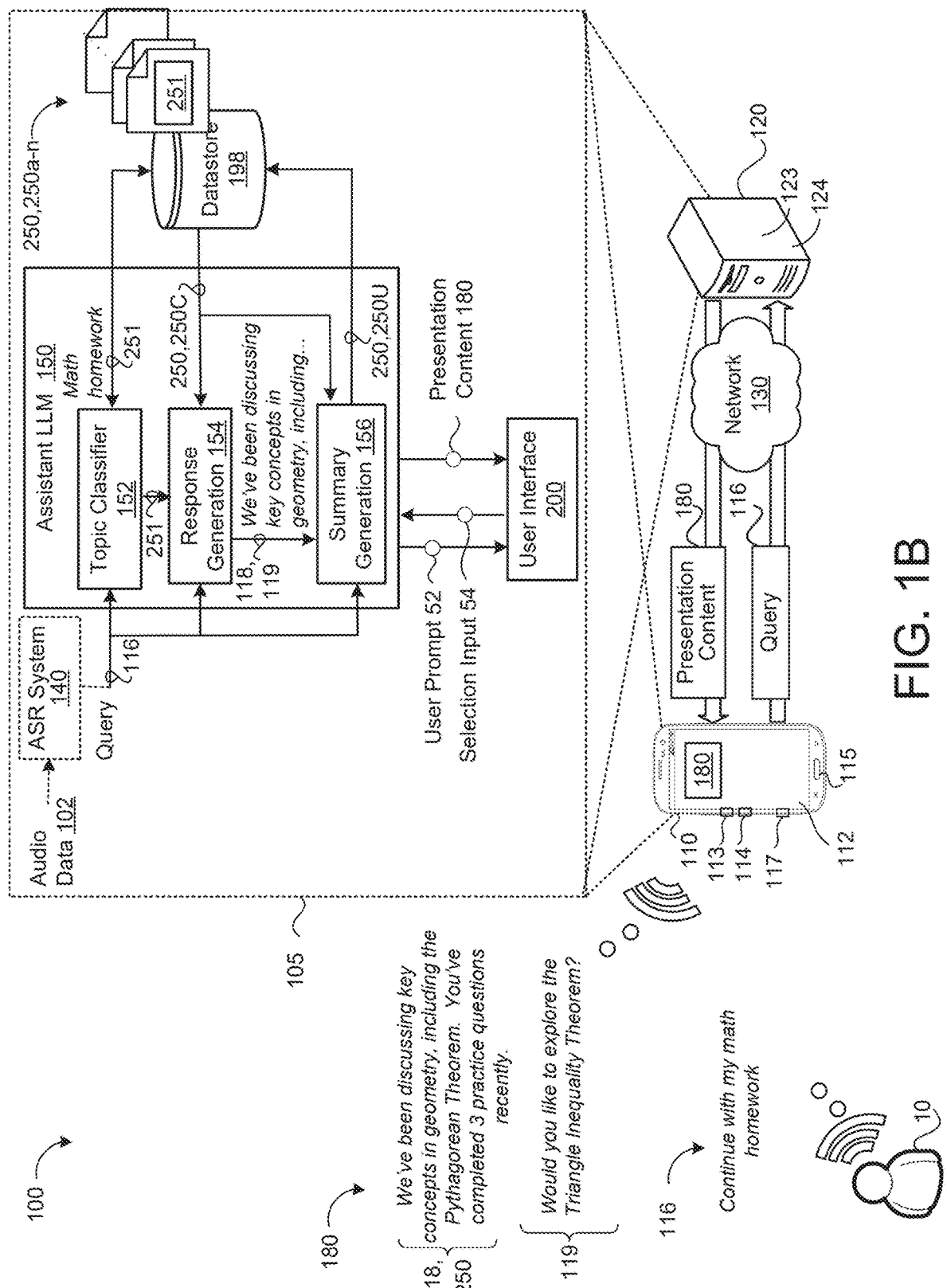

FIGS. 1A and 1B illustrate an example system 100 including a topic summary recall (TRS) system 105 for allowing an assistant interface 150 to create a topic 251 during a chat session between a user 10 and the assistant interface 150, identify the topic 251 in a subsequent chat session that is related to the topic 251, and for each corresponding query/response interaction in a chat session in which the topic 251 is identified, generate a corresponding topic summary 250 based on the query-response interaction that includes the user query 116 and associated response 118 generated by the assistant interface 150 during the chat session. As used herein, the assistant interface 150 can include one or more large language models (LLMs) or may provide an interface for connecting to one or more LLMs. For simplicity, the assistant interface 150 may be interchangeably referred to as an assistant LLM 150. The TRS 105 may store the corresponding topic summary 250 as an artifact and append the corresponding topic summary 250 to a new query 116 as context when the TSR system 105 identifies, or otherwise classifies, the new query 116 as related to the topic 251.

As used herein, the term "chat session" may be interchangeable referred to as a "dialog" or "dialog session" between the user 10 and the assistant LLM 150 in which the user 10 issues one or more queries 116 in natural language that each specify a corresponding task for the assistant LLM 150 to perform on the user's behalf and the assistant LLM 150 generates a corresponding response 118 to each query 116 that either conveys an answer to the query 116 or otherwise conveys that performance of the task specified by the query 116 is fulfilled or is in progress. Each query 116 and corresponding response 118 may correspond to a query-response interaction. As such, a chat session includes a time snippet of query-response interactions between the user 10 and the assistant LLM 150, whereby the user 10 has the ability to start new chat sessions, continue existing chat sessions, or delete chat sessions. Notably, the quality of the conversation within a single chat session improves as the number of queries 116 and responses 118 between the user 10 and the assistant LLM 150 grows since the assistant LLM 150 uses the previous query-response interactions as contexts for learning to provide better responses 118. In scenarios when a user starts a new chat session with the assistant LLM 150 that is related to a topic 251 discussed during one or more previous chat sessions, the TRS system 105 described herein is able to incorporate knowledge from the one or more previous chat sessions related to the topic 251 for use during the new chat session without having to start fresh.

As will become apparent, when the user 10 directs a new query 116 to the assistant LLM 150 that is related to an existing topic 251 or otherwise discussed in one or more previous chat sessions, the TRS system 105 can recall a current topic summary 250, 250C (FIG. 1B) generated during a most recent previous chat session related to the topic 251 and append the current topic summary 250C to the new query 116 such that the assistant LLM 150 generates a corresponding response 118 that is conditioned on, or otherwise uses information sourced from, the corresponding topic summary 250C. Based on the new query 116 and the corresponding response 118 generated by the assistant LLM 150, the TRS system 105 may generate an updated topic summary 250, 250U to reflect the current state or progress of the topic during all previous chat sessions between the user and the assistant LLM 150 that are related to the topic 251. A given chat session containing multiple query-response interactions between the user 10 and the assistant LLM 150 may span, or other include, multiple unrelated topics.

Generally, the user 10 inputs, via a user device 110, a query 116 to the assistant LLM 150 specifying a particular action or task the user 10 wants the assistant LLM 150 to perform on behalf of the user 10. The query 116 may include a natural language query 116 for the assistant LLM 150 to process by performing query interpretation to ascertain the particular action to be performed. As such, the query 116 input to the assistant LLM 150 may include a natural language prompt that specifies the particular action to be performed. In addition to the natural language prompt specifying the particular action to be performed, the query 116 may also include one more documents associated with the natural language prompt. For instance, the query 116 may include the natural language prompt "Solve this math problem" and a document that conveys underlying text and/or equations conveying the math problem for the assistant LLM 150 to solve. The assistant LLM 150 may include a multimodal interface capable of processing documents spanning multiple document types including text, tables, and images. The document could also include an audio file or computer code.

Fulfillment of the particular action specified by the query 116 will improve when the assistant LLM 150 is able to condition the query 116 on the associated current topic summary 250, 250c that incorporates knowledge from the one or more previous chat sessions related to the topic 251. As such, the user 10 may provide a new query 116 related to a particular topic 251 and the TRS system 105 seamlessly recalls the associated topic summary 250 so that the assistant LLM 150 can continue where last dialog session related to the particular topic 251 left off even when the new query 116 is used into a completely new chat session or in an existing chat session associated with an unrelated topic. Based on the corresponding response 118 to the new query 116 generated by the assistant LLM 150 and/or the topic summary 250 generated for the particular topic 251, the assistant LLM 150 is configured to provide, for output from the user device 110, presentation content 180. The user device 110 may display, on a screen 112 in communication with the user device 110, graphics, text, and/or other visual information that conveys the details of the presentation content 180. Additionally, or alternatively to providing visual details of the presentation content 180, the user device 110 may audibly output, from an audio output device (e.g., acoustic speaker) 117, the presentation content 180 as synthesized speech.

The system 100 includes the user device 110, a remote computing system 120, and a network 130. The user device 110 includes data processing hardware 113 and memory hardware 114. The user device 110 may include, or be in communication with, an audio capture device 115 (e.g., an array of one or more microphones) for converting utterances of natural language queries 116 spoken by the user 10 into corresponding audio data 102 (e.g., electrical signals or digital data). In lieu of spoken input, the user 10 may input a textual representation of the natural language query 116 via a user interface 200 executing on the user device 110. The user 10 may additionally input one or more documents as part of the query 116 together with a natural language prompt that specifies the particular action for the assistant LLM 150 to perform on the user's behalf. In scenarios when the user speaks a natural language query 116 captured by the microphone 115 of the user device 110, an automated speech recognition (ASR) system 140 executing on the user device 110 or the remote computing system 120 may process the corresponding audio data 102 to generate a transcription of the query 116. Here, the transcription conveys the natural language query 116 as a textual representation for input to the assistant LLM 150. The ASR system 140 may implement any number and/or type(s) of past, current, or future speech recognition systems, models, and/or methods including, but not limited to, an end-to-end speech recognition model, such as streaming speech recognition models having recurrent neural network-transducer (RNN-T) model architectures, a hidden Markov model, an acoustic model, a pronunciation model, a language model, and/or a naïve Bayes classifier. In some examples, the ASR system 140 includes an audio encoder for generating an encoded representation of input audio data and the assistant LLM 150 provides a LLM configured to operate as a speech decoder by decoding the encoded representation into the corresponding transcription of the query 116.

The user device 110 may be any computing device capable of communicating with the remote computing system 120 through the network 130. The user device 110 includes, but is not limited to, desktop computing devices and mobile computing devices, such as laptops, tablets, smart phones, smart speakers/displays, digital assistant devices, smart appliances, internet-of-things (IoT) devices, infotainment systems, vehicle infotainment systems, and wearable computing devices (e.g., headsets, smart glasses, and/or watches).

The remote computing system 120 may be a distributed system (e.g., a cloud computing environment) having scalable elastic resources. The resources include computing resources 123 (e.g., data processing hardware) and/or storage resources 124 (e.g., memory hardware). Additionally or alternatively, the remote computing system 120 may be a centralized system. The network 130 may be wired, wireless, or a combination thereof, and may include private networks and/or public networks, such as the Internet.

With continued reference to FIGS. 1A and 1B, the TSR system 105 includes the ASR system 140, the assistant LLM 150, and the user interface 200. The ASR system 140 may be optional or only leveraged when the user 10 prefers spoken input of natural language queries 116 as opposed to typed input. The ASR system 140 may be a disparate system that is distinct from the TSR system 105. In some implementations, the TSR system 105 executes on both the data processing hardware 113 of the user device 110 and the data processing hardware 123 of the remote computing system 120. For instance, one or more components of the TSR system 105 may execute on the data processing hardware 113 of the user device 110 while one or more other components of the TSR system 105 may execute on the remote computing system 120.

The assistant LLM 150 includes a topic classifier module 152, a response generation module 154, and a summary generation module 156. In some examples, a single LLM executes each of the topic classifier module 152, the response generation module 154, and the summary generation module 156. In other examples, two or more LLMs are utilized by to execute the topic classifier module 152, the response generation module 154, and the summary generation module 156. For instance, a first LLM may execute the topic classifier module 152 and a second LLM may execute the response and summary generation modules 154, 156, wherein the first LLM includes less parameters than the second LLM since the topic classifier module 152 is only tasked for processing natural language queries for classifying a topic associated with the natural language queries.

As an example, FIG. 1A shows the user 10 issuing a new query 116 that is associated with a new topic 251 that has not been previously discussed in any previous chat sessions between the user 10 and the assistant LLM 150. For instance, the new query 116 includes the natural language prompt "For my homework, how can I describe the Pythagorean theorem mathematically?" The topic classifier module 152 initially processes the new query 116 to classify the new query 116 as being related to an existing topic 251 previously discussed in one or more previous query-response interactions or a new topic 251 not previously discussed in any previous chat sessions. Accordingly, the topic classifier module 152 may be agnostic to whether or not each incoming query 116 is related to any existing topics or new topics not previously discussed. In the example shown, the topic classifier module 152 receives or accesses a current list of existing topics 251 from a plurality of topic summaries 250, 250a-n stored in a topic summary datastore 198. Here, each topic summary 250 stored in the topic summary datastore 198 includes a corresponding summary of past query-response interactions related to a particular topic 251 that were derived during one or more previous chat sessions between the user 10 and the assistant LLM 150. The number of topic summaries 250 stored in the topic summary datastore 198 increases each time a query-response interaction is related to a new topic not previously discussed in any previous chat sessions between the user 120 and the assistant LLM 150. In the example of FIG. 1A, the topic classifier module 152 processes the new query 116 conditioned on the current list of topics 251 to determine the new query 116 is not related to any of the existing topics 251, and therefore classifies the new query 116 as being related to a new topic 251 not previously discussed in any previous chat sessions. In the example, the topic classifier module 152 classifies the new query 116 as being related to the new topic 251 of "Math homework". The topic classifier module 152 may instruct the topic summary datastore 198 to store an entry for the new topic 251 of "Math homework".

The response generation module 154 also receives the new query 116 as a prompt to generate a response 118 to the new query 116. While not depicted in the example, the query 116 issued by the user may also include one or more documents for the response generation module 154 to process with the natural language prompt for generating the response 118. Since the new query 116 is classified as being be related to the new topic 251 not previously discussed in any prior chat sessions, there is no existing topic summary 250 related to the new topic 251, and therefore, the response generation module 154 is not conditioned on any existing topic summary 250 related to the new topic 251 when generating the response 118 to the new query 116. In the example, the response generation module 152 generates the response 118 "Here's a mathematical expression of the Pythagorean theorem" that answers the question conveyed by the new query 116 "For my homework, how can I describe the Pythagorean theorem mathematically?" In some examples, when the topic classifier module 152 classifies a new query as being related to a new topic 251 not previously discussed, the topic classifier module 152 provides an input message to the response generation module 152 that indicates that the new query 251 is related to the new topic and/or conveys that no topic summary 250 related to the new query 112 is available. For instance, the input message 153 may include natural language text that states "The query is related to a new topic and no topic summary is available".

After the response generation module 154 generates the response 118 for the new query 116, the summary generation module 156 processes the query 116 and the response 118 as a query-response interaction to generate a corresponding new topic summary 250, 250N for the new topic 251 classified by the topic classifier module 152. Since no existing topic summary 250 for the new topic 251 exists in the datastore 198, the new topic summary 250N generated for the query-response interaction may be stored in the datastore 198 as an initial topic summary 250N for the new topic 251 titled "Math homework". For instance, the topic summary 250N may include the text "We've covered the Pythagorean theorem" based on the query 116 "For my homework, how can I describe the Pythagorean theorem mathematically" and the corresponding response 118 "Here's a mathematical expression of the Pythagorean theorem". The topic summary 250N stored in the datastore 198 may further include the corresponding query-response interaction from which the topic summary was generated. As such, the topic summary 250 for the topic 251 is now stored in the datastore 198 as one of the plurality of topic summaries 250a-n each related to a different respective topic 251 and associated with a respective summary of past query-response interactions between the user 10 and the assistant LLM 150 that are related to the different respective topic 251. Accordingly, the response generation module 154 may recall the topic summary 250 to incorporate prior knowledge related to the topic 251 when processing a subsequent query that the topic classifier 152 classifies as being related to the topic 251.

The assistant LLM 150 may provide presentation content 180 to the user interface 200 for output from the user device 10 that includes the response 118 to the query 116 and may include the topic summary 250 generated for the query-response interaction related to the topic 251. The user device 110 may audibly output, from an audio output device (e.g., acoustic speaker) 117, the presentation content 180 as synthesized speech. Additionally or alternatively, the user device 110 may display, on a screen 112 in communication with the user device 110, graphics, text, and/or other visual information that conveys the details of the presentation content 180.

Figure 2A:
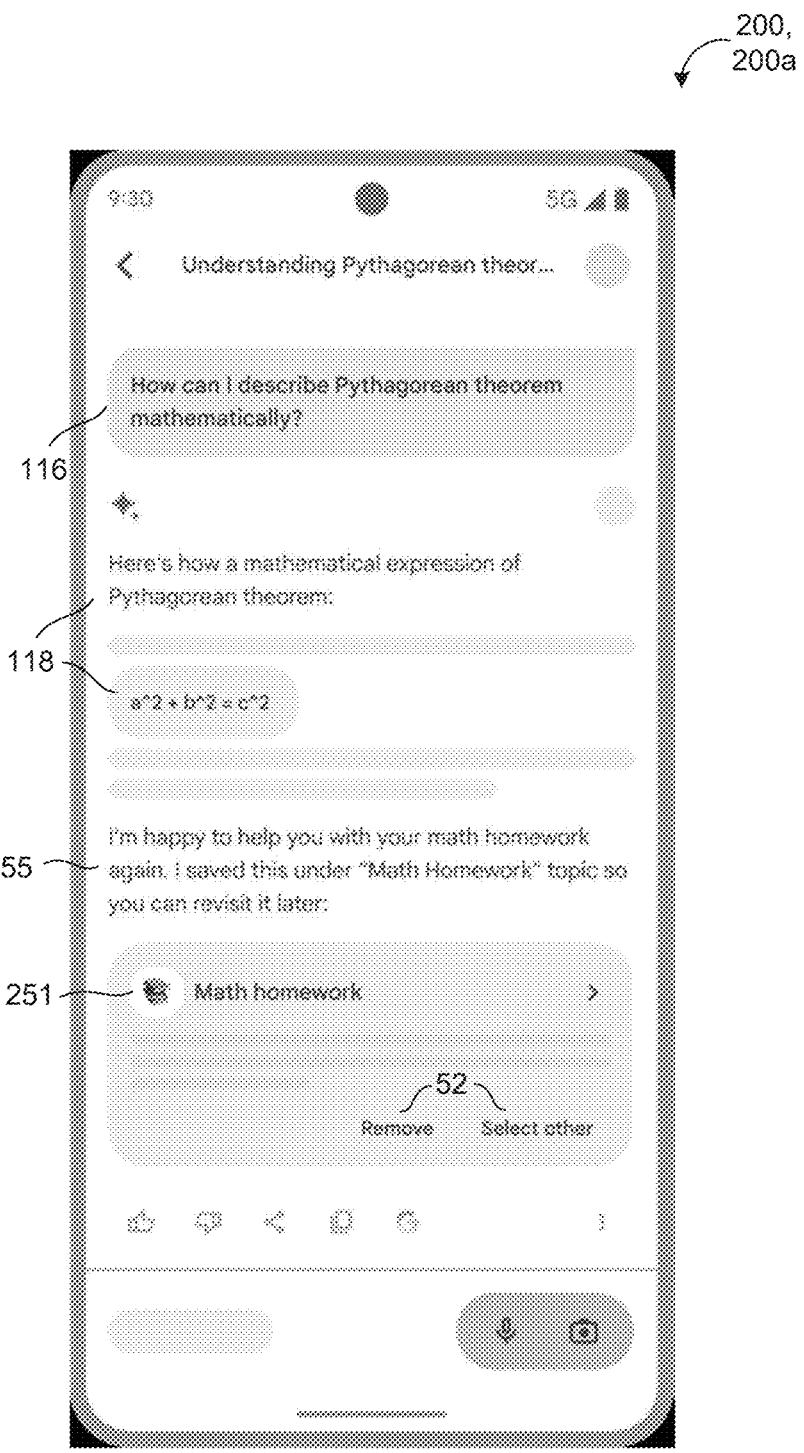
FIGS. 2A-2G are schematic views of example user interfaces depicting presentation content related to a particular topic discussed during one or more chat sessions between a user and an assistant interface.

In scenarios when the topic classifier 152 classifies a query 116 as a new topic not previously discussed in any previous chat sessions between the user 10 and the assistant LLM 150, the assistant LLM 150 may issue a user prompt 52 prompting the user 10 to acknowledge the new topic 251 classified by the topic classifier 252. For instance, in addition to the query 116 and the response 118 generated by the assistant LLM 150, the presentation content 180 output from the user device 10 may also include a message 55 (FIG. 2A) informing the user of the name of the new topic 251 and that the assistant LLM 150 will save the corresponding topic summary 250 for the user 10 to recall and revisit during subsequent chat sessions. Here, the presentation content 180 may include the user prompt 52 prompting the user 10 with the option to provide selection input(s) 54 for changing the name of the new topic 251, removing the topic 251 so that the corresponding topic summary 250 cannot be recalled or revisited, or confirming that the user 10 would like to save the corresponding topic summary 250. Continuing with the example of FIG. 1A, FIG. 2A provides an example user interface 200a visually displaying the presentation content 180 that includes the user query 116, the corresponding response 118 to the query 116 generated by the response generation module 154, and the message 55 including the user prompt 52 prompting the user to acknowledge the new topic 251 classified for the query-response interaction with options for the user 10 to edit the name of the new topic 251 and remove the new topic 251 so that the corresponding topic summary 250 cannot be recalled or revisited during subsequent chat sessions. The user may provide the selection input 54 via a user input indication indicating selection of graphics or text displayed in the user interface 250a for removing/editing the classification of the new topic 251. The user 10 may also have the option to provide the selection input 54 audibly, for instance, by selecting a microphone graphic and then speaking the selection input 54 that the ASR system 140 transcribes for processing by the assistant LLM 150 to ascertain the selectin input 54 spoken by the user 10.

Continuing with the example, FIG. 1B shows the user 10 issuing another query 116 during the same chat session or a subsequent chat session in which the query 116 requests the assistant LLM 150 to recall the current topic summary 250C related to the topic 251 for "Math Homework" which was initially classified by the topic classification module 152 in FIG. 1A. Here, the query 116 corresponds to a recall query which includes a natural language query requesting the assistant LLM 150 to recall the topic summary 200 related to the topic 251 of "Math Homework". In the example shown, the recall query 116 issued by the user 10 states, "Continue with my math homework". The topic classifier module 152 initially processes the recall query 116 to classify the recall query 116 as either being related to a particular existing topic 251 previously discussed in one or more previous query-response interactions or a new topic 251 not previously discussed in any previous chat sessions. In the example shown, the topic classifier module 152 receives or accesses the current list of existing topics 251 from the plurality of topic summaries 250, 250a-n stored in the topic summary datastore 198 and processes the recall query 116 conditioned on the current list of topics 251 to determine that the recall query 116 is related to the existing topic 201 "Math Homework", and therefore identifies the recall query 116 as being related to the existing topic 251 discussed in one or more previous chat sessions. In the example shown, the topic classifier module 152 classifies the new query 116 as being related to the new topic 251 of "Math homework". In some implementations, the topic classifier module 152 instructs the topic summary datastore 198 to provide the current topic summary 250C that was generated/updated during a most recent chat session related to the topic 251 of "Math homework" to the response generation module 154. In other implementations, the topic classifier module 152 provides the existing topic 251 that was identified as being related to the recall query 116 to the response generation module 154 and the response generation module 154 queries the datastore 198 using the existing topic 251 to retrieve the current topic summary 250C related to the topic 251 of "Math homework".

The response generation module 154 also receives the recall query 116 as a natural language prompt to generate a response 118 to the recall query 116. Since the recall query 116 is classified, or otherwise identified, as being be related to the existing topic 251 previously discussed in one or more prior chat sessions, the response generation module 154 is able to recall the current topic summary 250 related to the existing topic 251 and condition the recall query 116 on the current topic summary 250C that incorporates knowledge from the one or more previous chat sessions related to the topic 251. In the example shown, the current topic summary 250C is generated and updated over multiple prior query-response interactions related to the topic 251 "Math Homework" and includes the summary, "We've been discussing key concepts in geometry, including the Pythagorean Theorem. You've completed 3 practice questions recently. Based on our conversations, you have a good grasp on how to message the length of a hypotenuse, and when to use the Angle Sum Property of Triangles". That is, in addition to the initial query-response interaction depicted in FIG. 1A in which the user learned how to mathematically express the Pythagorean Theorem, the topic 251 was also discussed in subsequent query-response interactions related to the topic 251 of "Math homework" in which the assistant LLM 150 facilitated practice questions, and accordingly, the summary generation module 156 continuously updates the topic summary 250C related to the topic 251 "Math homework" after each of the subsequent query-response interactions to reflect a complete and up to date summary of all the prior query-response interactions related to "Math homework" between the user 10 and the assistant LLM 150.

In the example of FIG. 1B, upon processing the query 116 conditioned on the current topic summary 250C related to the topic 251 of "Math homework", the response generation module 154 ascertains that the query 116 corresponds to a recall query requesting the assistant LLM 160 to simply recall the current topic summary 250C. As such, the response generation module 154 outputs a response 118 that answers the query 116 by conveying the current topic summary 250C generated from all prior query-response interactions related to the existing topic 251 of "Math homework". In some examples, the response generation module 154 modifies the current topic summary 250C when generating the response 118 to recall queries 116. For instance, the response generation module 154 may prepend one or more phrases or sentences to the current topic summary 250C so that the corresponding response 118 addresses the query 116 in a conversational manner. In some implementations, the recall query 116 may specify specific details from the current topic summary 250C that the user 10 wants the assistant LLM 150 to recall. In these implementations, the response generation module 154 may re-summarize the current topic summary 250C to provide a response 118 that only conveys those specific details from the current topic summary 250C specified by the recall query 116.

Additionally, and based on the response generation module 154 generating the response 118 to the query 116 in the current query-response interactions that simply recalls all or portions of the current topic summary 250C previously discussed, the response generation module 154 may further generate one or more follow-up questions 119 conditioned on the current topic summary 250C for the user 10 to answer. For instance, since the current topic summary 250C indicates that passed discussions are related to geometry and Pythagorean Theorem has been covered, the response generation module 154 may generate the follow-up question 119 that inquires whether the user would like to explore the Triangle Inequality Theorem next.

After the response generation module 154 generates the response 118 for the recall query 116, the summary generation module 156 processes the query 116 and the response 118 as a query-response interaction to generate an updated topic summary 250, 250U for the existing topic 251. Since the example of FIG. 1B includes the response 118 simply recalling the current topic summary 250C so that the user 10 can quickly ascertain all the past query-response interactions related to the topic 251 of "Math homework", the summary generation module 156 does not alter the topic summary 250 the instant query-response interaction does not convey any new or additional content related to the topic 251 that has not already been previously discussed, and thus, not already conveyed by the current topic summary 250. However, the summary generation module 156 may store an updated topic summary 250U in the datastore 198 that further includes the corresponding query-response interaction that includes the recall query 116 and the corresponding response 118 that conveys the current topic summary 250C. Notably, the topic summary 250 stored in the datastore 198 for each existing topic 251 may include the history of all query-response interactions between the user 10 and the assistant LLM 150. Moreover, each query-response interaction in the history may be timestamped.

The assistant LLM 150 may provide presentation content 180 to the user interface 200 for output from the user device 10 that includes the response 118 to the query 116 and may include the topic summary 250 generated for the query-response interaction related to the topic 251. In scenarios when the response generation module 154 also generates follow-up questions 119 based on the topic summary 150 and/or query 116 for which a corresponding response 118 was generated, the presentation content provided to the user interface 200 by the assistant LLM 150 may also include the follow-up questions 119. While the follow-up questions 119 can be displayed visually as text or audibly as synthesized speech, the user interface 200 may display the follow-up questions as selectable graphical elements, that when selected by the user 10, cause the user interface 200 to issue the follow-up question 119 as a subsequent query 116 for the assistant LLM 150 to answer on the user's behalf. By the same notion, in scenarios when the user interface 200 audibly outputs a follow-up question 119 as synthesized speech, the user 10 may provide a spoken input that confirms that the user 10 wants the follow-up question 119 answered, and thus, causes the user interface 200 to issue the follow-up query 119 as the subsequent query 116 for the assistant LLM 150 to answer. The user device 110 may audibly output, from an audio output device (e.g., acoustic speaker) 117, the presentation content 180 as synthesized speech.

Continuing with the example of FIG. 1B, FIGS. 2B-2G provide example user interfaces 200b-g visually displaying the presentation content 180 after the query-response interaction in which the user 10 issued the recall query 116 "Continue with my math homework" and the assistant LLM 150 generated the corresponding response 118 that includes the topic summary 250 summarizing all prior query-response interactions related to the topic 251 of "Math homework". The example user interfaces 200b-g of FIGS. 2B-2G may serve as different entry points for the user 10 to interact with (e.g., issue queries 116) with the assistant LLM 150 and allow the user 10 to interface with the assistant LLM 150 by representing prior discussions related to a specific topic as topic summaries of the prior discussions.

Figure 2B:
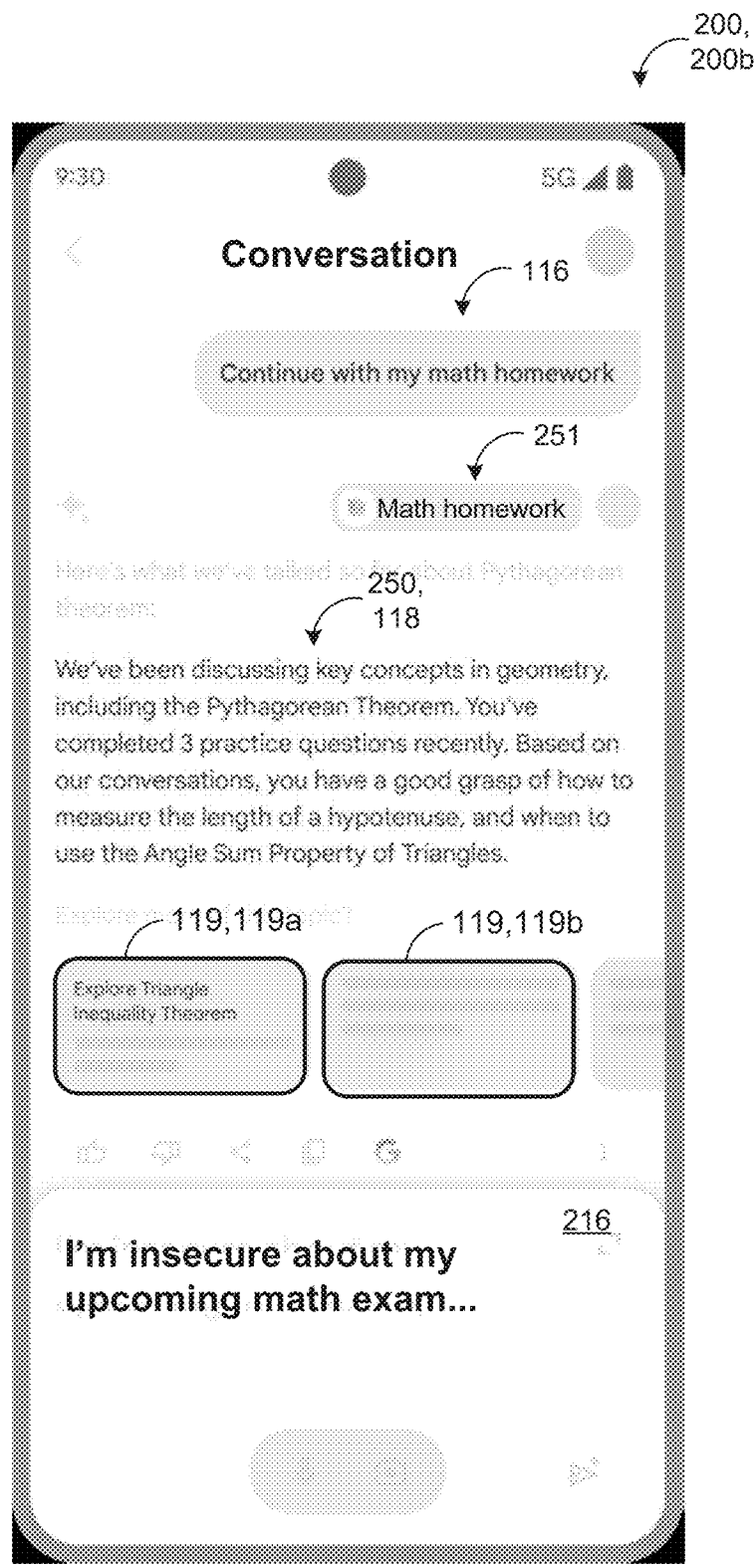

FIG. 2B shows an example user interface 200b depicting a conversational mode for the user 10 to interact with the assistant LLM 150. Here, the user interface 200b depicts a current chat session displaying the presentation content 180 including the recall query 116 issued by the user that includes the natural language text "Continue with my math homework", a graphical element indicating the topic 251 of "Math homework" identified/classified for the query 116 by the topic classifier module 152, and the response 118 to the recall query 116 output by the response generation module 154 that conveys the topic summary 250 recalled from the datastore 198. The user interface 200b additionally displays one or more follow-up questions 119, 119a-b generated by the response generation module 154. For instance, the user interface 200b for the conversation mode may present the follow-up questions 119 as suggested categories that the user 10 may want to explore. Here, the response generation module 154 may use the topic summary 250 as context for generating follow-up questions 119 that anticipate likely categories that the user 10 may want to explore. Here, the user 10 may provide a user input indication to select a graphical element related to the follow-up question 119a for exploring the Triangle Inequality Theorem in a subsequent query-response interaction. The interface 200b for the conversational mode further includes a query input field 216 for allowing the user 10 to issue a next query 116 directed toward the assistant LLM 150 during the chat session. The user 10 may issue the next query 116 by typing (e.g., via a keyboard) or spoken input for recognition by the ASR system 140 and displayed as recognized the query input field 216. Notably, upon selection of one of the graphical elements depicting the follow-up questions, the user interface 200b may issue the follow-up question as a next query for the assistant LLM 150 to answer.

Figure 2C:
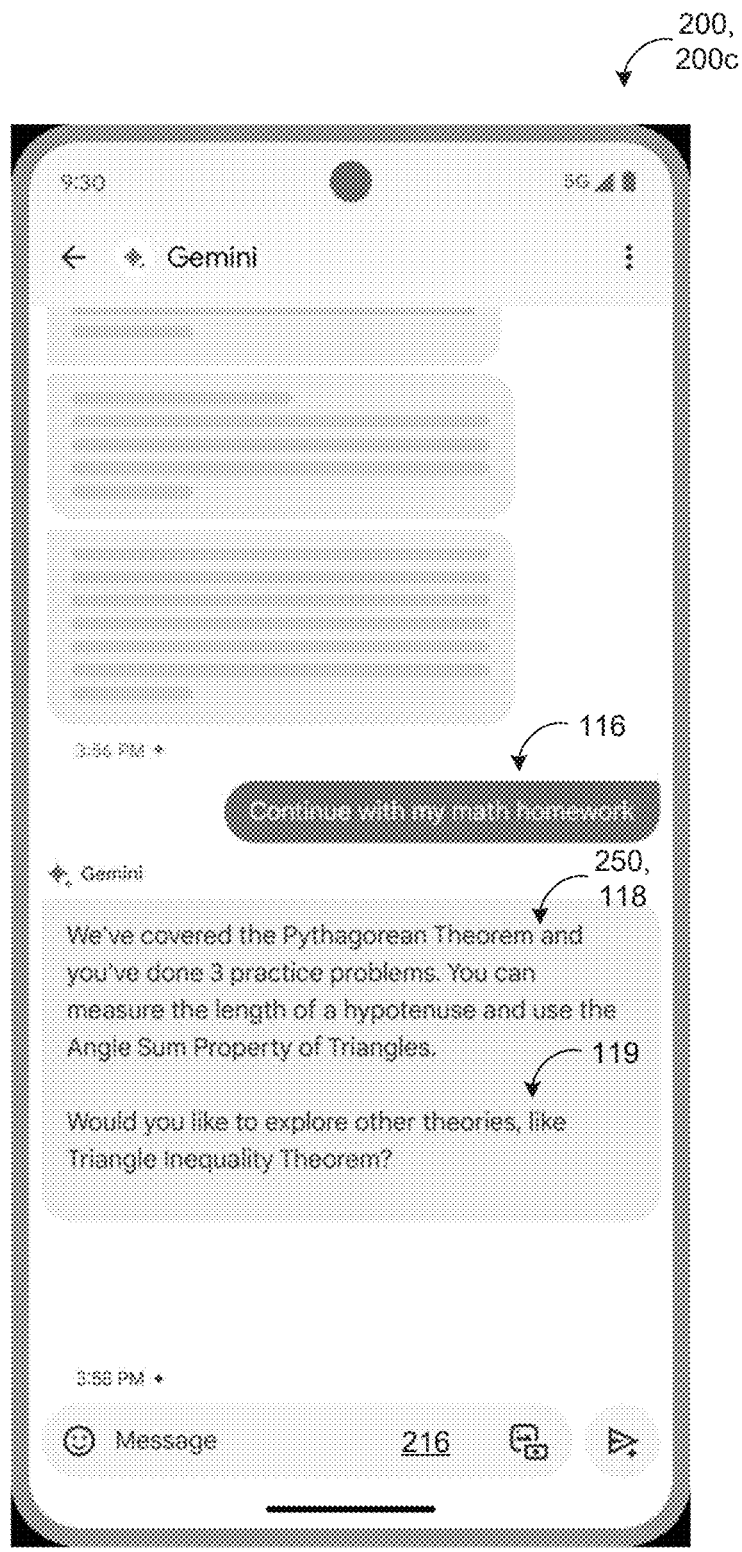

FIG. 2C shows an example user interface 200c depicting a messaging mode for the user 10 to interact with the assistant LLM 150. Here, the user interface 200c depicts messages between the user 10 and the assistant LLM 150 by displaying the presentation content 180 including the recall query 116 issued by the user that includes the natural language text "Continue with my math homework", the response 118 to the recall query 116 output by the response generation module 154 that conveys the topic summary 250 recalled from the datastore 198, and the follow-up question 119 generated by the response generation module 154 that includes the text "Would you like to explore other theories, like Triangle Inequality Theorem?". Like the interface 200b of FIG. 2A for the conversational mode, the interface 200c of FIG. 2C for the messaging mode further includes a query input field 216 for allowing the user 10 to issue a next query 116 directed toward the assistant LLM 150 during the chat session. The user 10 may issue the next query 116 by typing (e.g., via a keyboard) or spoken input for recognition by the ASR system 140 and displayed as recognized the query input field 216. The follow-up question 119 could serve as a hint/suggestion for the user 10 when issuing the next query 116 into the query input field 216.

Figure 2D:
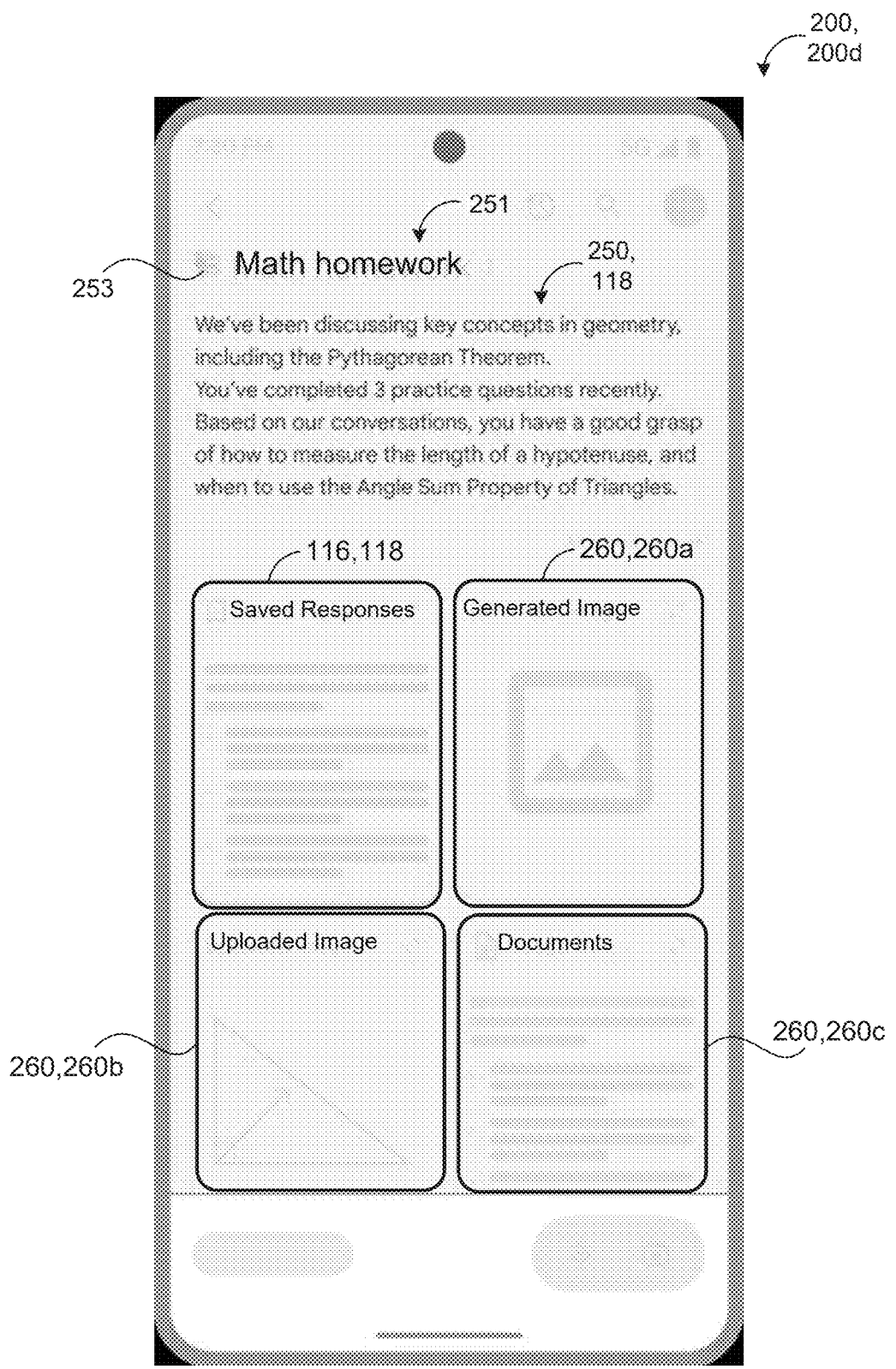

FIG. 2D shows an example user interface 200d depicting a topic page for recalling existing topics 251 and corresponding topic summaries 250 discussed in previous query-response interactions between the user 10 and the assistant LLM 150. The user 10 may interact with the user interface 200d by selecting an existing topic 251 from a dropdown list 253 on the topic page that the user 10 would like to recall. The dropdown list may include the current list of existing topics 251 from the plurality of topic summaries 250, 250a-n stored in the topic summary datastore 198 (FIGS. 1A and 1B). Optionally, the user interface 200d depicting the topic page may populate upon the user 10 issuing a query 116 that the topic summarization module 152 classifies as one of the existing topics and the response generation module 154 determines as a recall query 116. In the example shown, the user interface 200d displays the presentation content 180 including the response 118 to the recall query 116 output by the response generation module 154 that conveys the topic summary 250 recalled from the datastore 198. By contrast to the user interfaces 200b, 200c of FIGS. 2B and 2C depicting the conversational and messaging modes for interacting with the assistant LLM 150, the topic page depicted by the user interface 200d displays relevant content related to the topic 251 from prior query-response interactions that the user 10 can easily view and recall. For instance, a graphical element representing a history of prior query-response interactions 116, 118 related to the topic 201 can be selected by the user 10 to view any of the prior query-response interactions. The user interface 200d may also display additional content 260, 260a-n that was exchanged between the user 10 and the assistant LLM 150 during the prior query-response interactions related to the topic 251. For instance, any LLM-generated images 260a or images retrieved by the LLM 150 may be accessed by selecting a graphical element to populate the LLM-generated or LLM-retrieved images. Similarly, any uploaded images 260*b* uploaded by the user 10 may be accessed by selecting a graphical element to populate the uploaded images 260*b*. Here, the uploaded images 260*b* may correspond to images that the user 10 uploads to append to a query 116 directed toward the assistant LLM. For instance, the user 116 could issue a query 116 of "Help me solve this equation" and upload an image 260*b* of the equation mentioned in the query 116. The additional content 260*c* may also include a list of documents exchanged between the user 10 and the assistant LLM 150. Here, the list of documents may be accessed by selecting a graphical element to populate the list of documents.

Figure 2E:
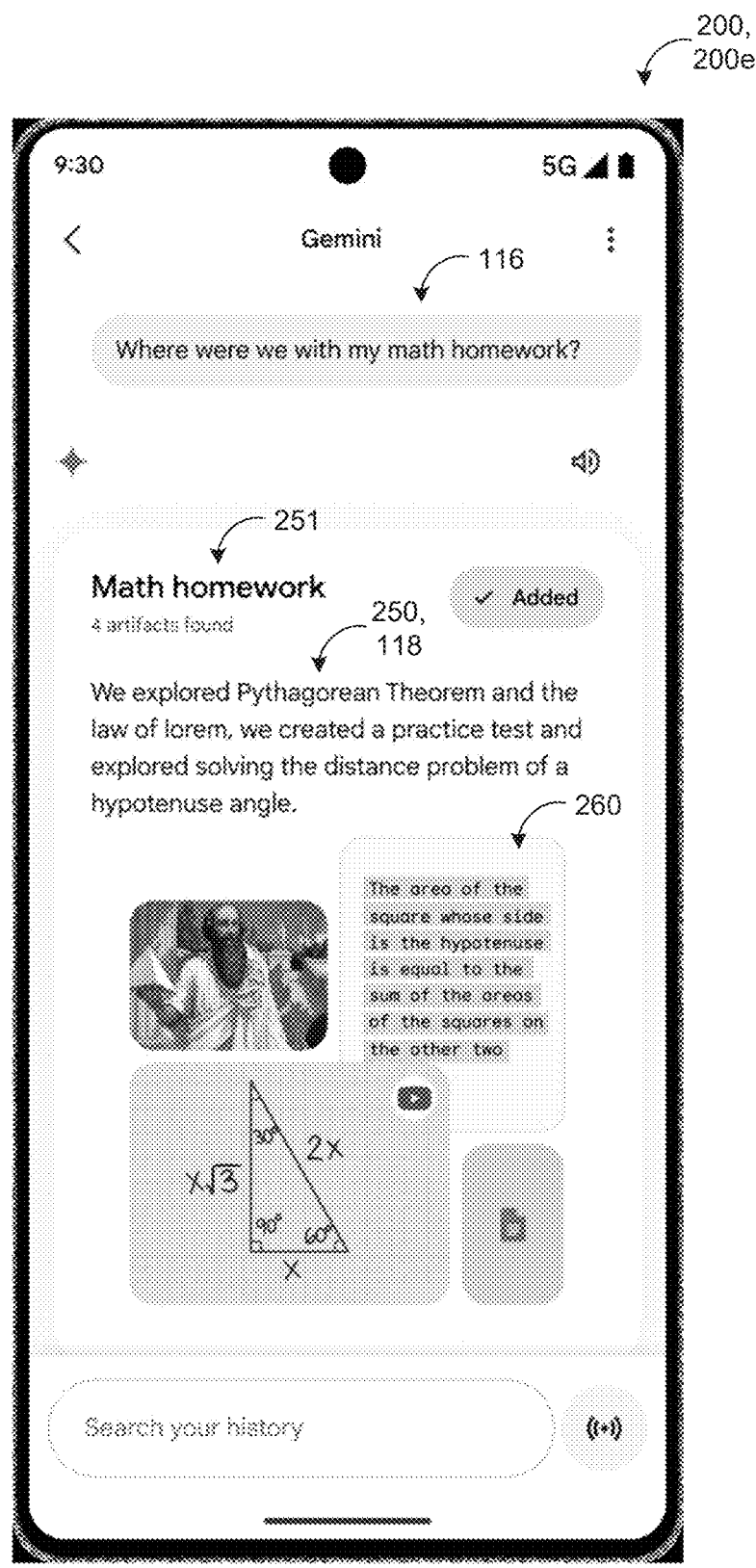

FIG. 2E shows an example user interface 200*e* depicting another conversational mode for the user 10 to interact with the assistant LLM 150. Here, the user interface 200*e* depicts a current chat session displaying the presentation content 180 including the recall query 116 issued by the user that includes the natural language text "Where were we with my math homework", a graphical element indicating the topic 251 of "Math homework" identified/classified for the query 116 by the topic classifier module 152, and the response 118 to the recall query 116 output by the response generation module 154 that conveys the topic summary 250 recalled from the datastore 198. The user interface 200*e* may also display additional content 260 that was exchanged between the user 10 and the assistant LLM 150 during the prior query-response interactions related to the topic 251.

Figure 2F:
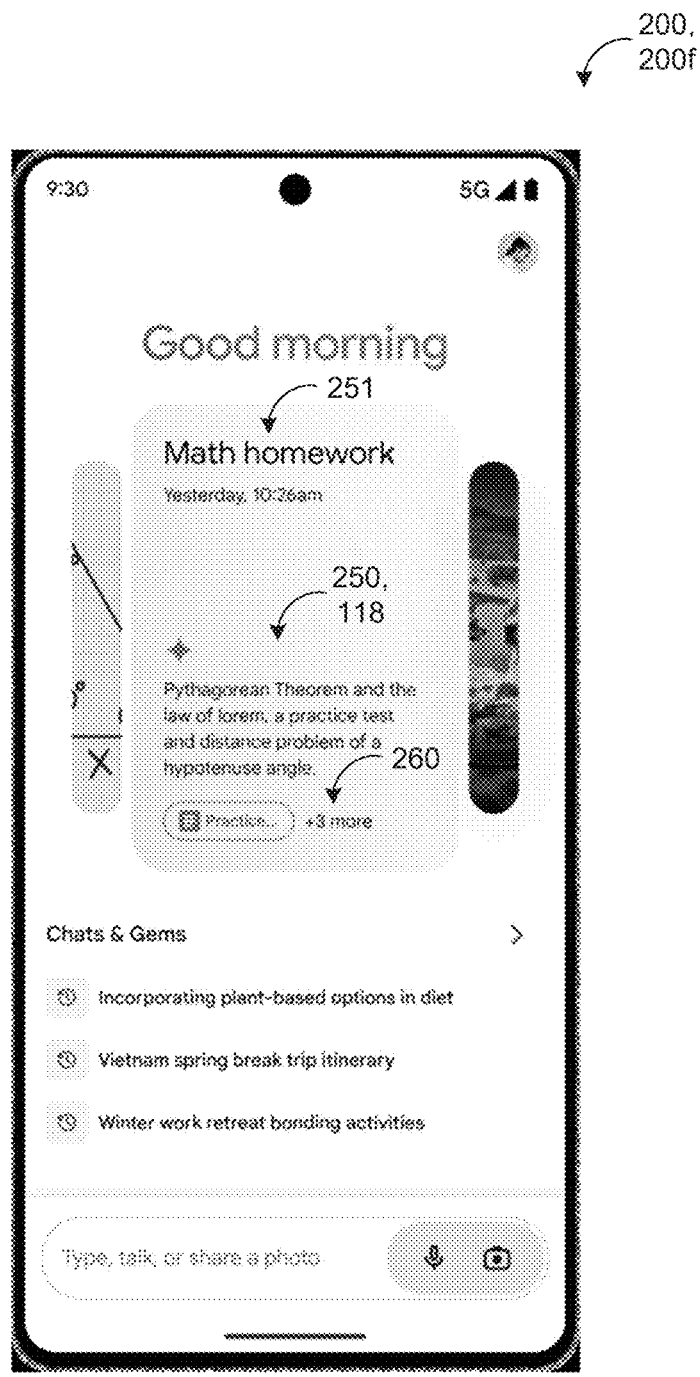

FIG. 2F shows an example user interface 200*f* depicting a zero state mode with relevant suggestions. The user interface 200*f* depicting the zero state mode offers a unique opportunity to help the user continue from where a previous chat session between the user 10 and the assistant LLM 150 left off. Here, the user interface 200*f* serves the user with the most relevant and recent topics immediately upon launching a software application for interacting with the assistant LLM 150. For instance, the user interface 200*f* displays a graphical element indicating the topic 251 of "Math homework" that was last discussed during a previous chat session as well the topic summary 250 recalled from the datastore 198. The user interface 200*f* may also display additional content 260 that was exchanged between the user 10 and the assistant LLM 150 during the prior query-response interactions related to the topic 251.

Figure 2G:
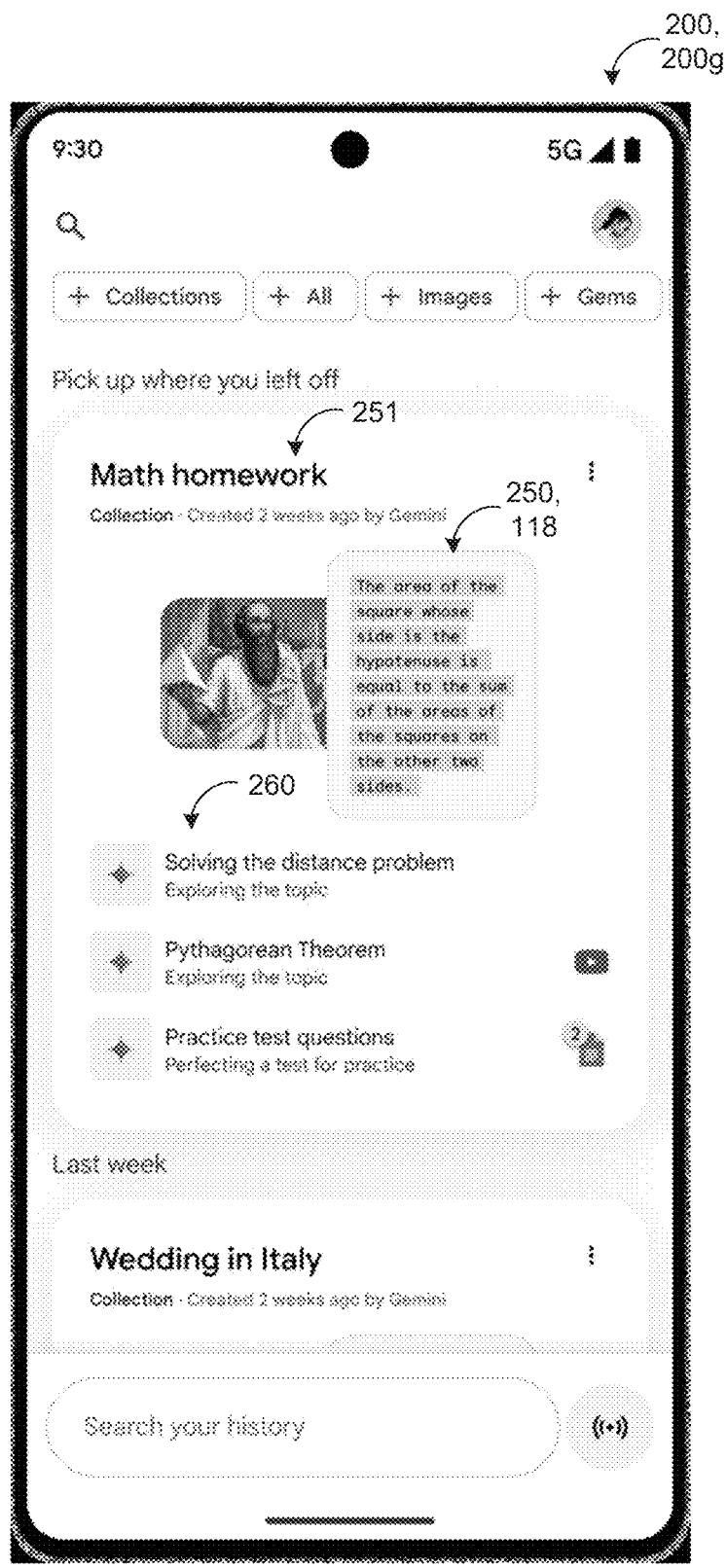

FIG. 2G shows an example user interface 200*g* depicting a topic screen for the user to recall and browse previously discussed topics and their associated topic summaries. Here, the user interface 200*g* receives a recall query 116 issued by the user that includes the natural language text "Pick up where you left off", a graphical element indicating the topic 251 of "Math homework", and the response 118 to the recall query 116 output by the response generation module 154 that conveys the topic summary 250 recalled from the datastore 198. The user interface 200*e* may also display additional content 260 that was exchanged between the user 10 and the assistant LLM 150 during the prior query-response interactions related to the topic 251. The topic screen also displays additional content 260 that was exchanged between the user 10 and the assistant LLM 150 during the prior query-response interactions related to the topic 251. Moreover, the topic screen structures and logically categorizes previous chat content within the user interface 200*g* to make it easy for the user to locate specific items/content that the user 10 wants to access.

Figure 3:
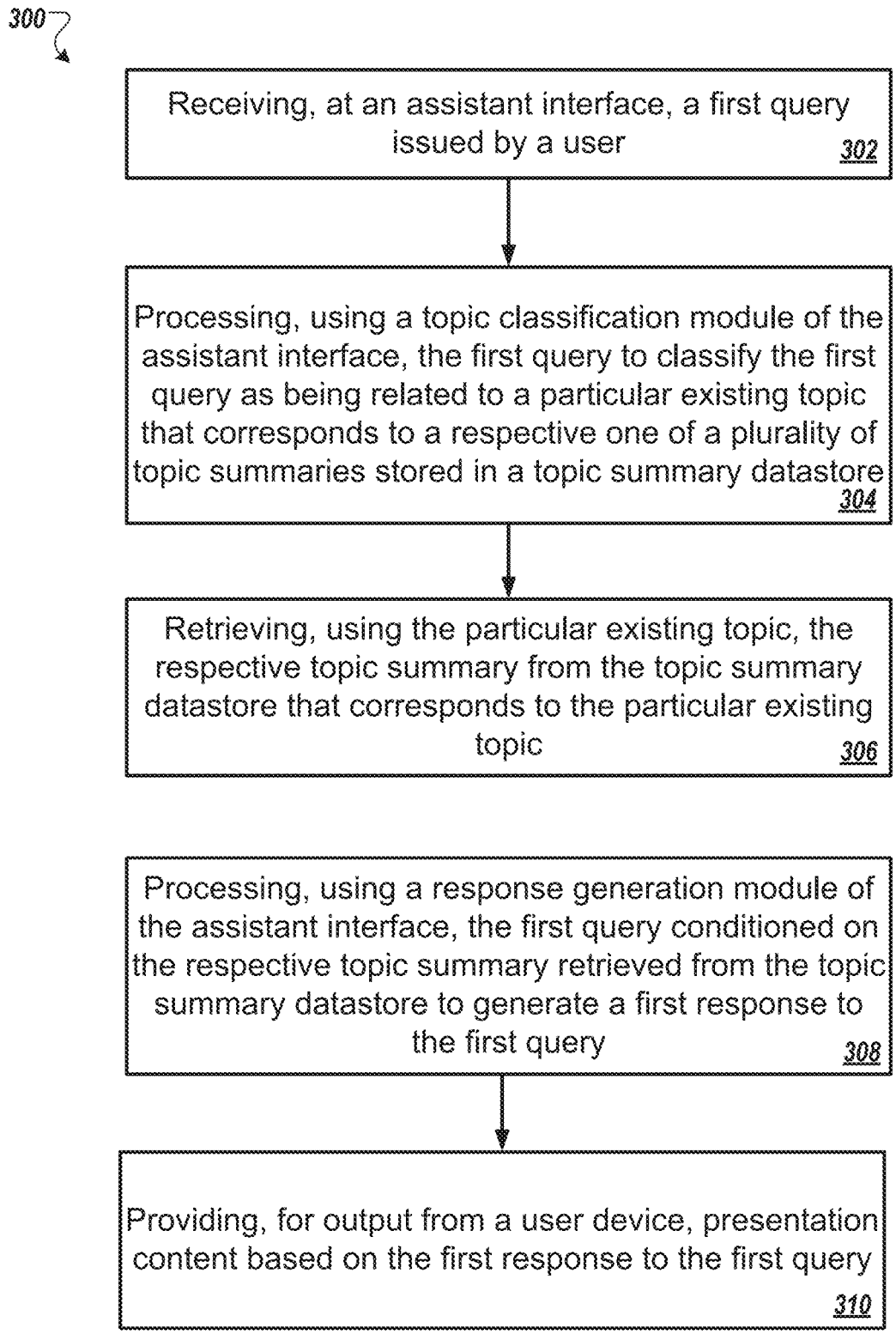
FIG. 3 is a flowchart of an example arrangement of operations for a method of classifying a query as being related to a previously discussed topic and generating a response to the query that is conditioned on a topic summary corresponding to the previously discussed topic.

FIG. 3 provides a flowchart of an example arrangement of operations for a method 300 of classifying a query as being related to a previously discussed topic and generating a response to the query that is conditioned on a topic summary corresponding to the previously discussed topic. The method 300 may execute on data processing hardware 410 (FIG. 4) based on instructions stored on memory hardware 420 (FIG. 4) in communication with the data processing hardware 410. The data processing hardware 410 may include the data processing hardware 113 of the user device 10 and/or the data processing hardware 123 of the remote server system 120. The memory hardware 420 may include the memory hardware 114 of the user device 10 and/or the memory hardware 124 of the remote server system 120.

At operation 302, the method 300 includes receiving, at an assistant interface 150, a first query 116 issued by a user 10. At operation 304, the method 300 includes processing, using a topic classification module 152 of the assistant interface 150, the first query 116 to classify the first query as being related to a particular existing topic 251 that corresponds to a respective one of a plurality of topic summaries 250, 250*a-n* stored in a topic summary datastore 198. The topic summary data store 198 may be overlain on the memory hardware 420. Each respective topic summary of the plurality of topic summaries 250 stored in the topic summary datastore 198 corresponds to a different respective topic 251 and is associated with a respective summary of past query-response interactions between the user 10 and the assistant interface 150 that are related to the different respective topic 251.

At operation 306, the method 300 includes retrieving, using the particular existing topic 251 that the first query 116 is classified as being related to, the respective topic summary 250 from the topic summary datastore 198 that corresponds to the existing topic 251. At operation 308, the method 300 includes processing, using a response generation module 154 of the assistant interface 150, the first query conditioned on the respective topic summary retrieved from the topic summary datastore to generate the first response to the first query 116. At operation 310, the method 300 includes providing, for output from a user device 10 associated with the user 10, presentation content 180 based on the first response 118 to the first query 116.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
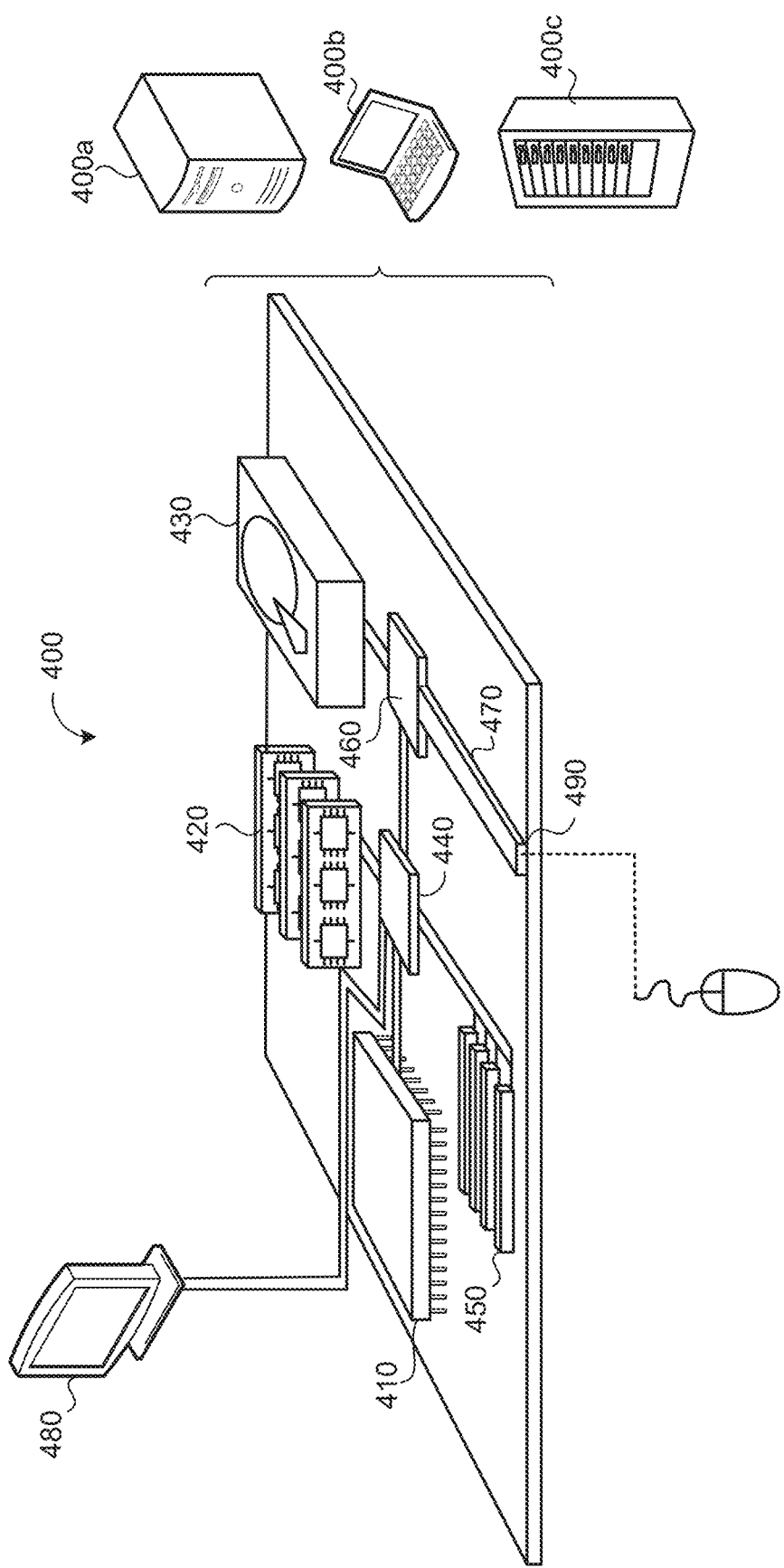
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executing on data processing hardware that causes the data processing hardware to perform operations comprising:
   receiving, at an assistant interface, a second query issued by a user, the second query specifying an action for the assistant interface to perform on behalf of the user;
   processing, using a topic classification module, the second query to classify the second query as being related to a new topic not previously discussed in any previous query-response interactions between the user and the assistant interface;
   processing, using a response generation module, the second query to generate a second response to the second query;
   processing, using a summary generation module of the assistant interface, the second response to generate a respective topic summary corresponding to the new topic classified by the topic classification module;
   storing the respective topic summary corresponding to the new topic classified by the topic classification module in a topic summary datastore;
   receiving, at the assistant interface, a first query issued by the user;
   processing, using the topic classification module of the assistant interface, the first query to classify the first query as being related to a particular existing topic that corresponds to a respective one of a plurality of topic summaries stored in the topic summary datastore, each respective topic summary of the plurality of topic summaries stored in the topic summary datastore corresponding to a different respective topic and associated with a respective summary of past query-response interactions between the user and the assistant interface that are related to the different respective topic;
   retrieving, using the particular existing topic that the first query is classified as being related to, the respective topic summary from the topic summary datastore that corresponds to the particular existing topic;
   processing, using the response generation module of the assistant interface, the first query conditioned on the respective topic summary retrieved from the topic summary datastore to generate a first response to the first query; and
   providing, for output from a user device associated with the user, presentation content based on the first response to the first query,
   wherein the particular existing topic that the first query is classified as being related to comprises a new topic that the second query is classified as being related to, and
   wherein the respective topic summary retrieved from the topic summary datastore that corresponds to the particular existing topic comprises the respective topic summary corresponding to the new topic classified by the topic classification module.

2. The computer-implemented method of claim 1, wherein the operations further comprise:
   determining a name for the new topic that the first query is classified as being related to; and
   providing, for output from the user device, a message informing the user of the name of the new topic and that the assistant interface will store the respective topic summary in the topic summary datastore.

3. The computer-implemented method of claim 1, wherein:
   the first query issued by the user requests the assistant interface to recall the respective topic summary that corresponds to the particular existing topic that the first query is classified as being related to; and
   the first response to the first query comprises the respective topic summary retrieved from the topic summary datastore.

4. The computer-implemented method of claim 1, wherein:
   the first query issued by the user specifies an action for the assistant interface to perform on behalf of the user, the action related to the particular existing topic that the first query is classified as being related to; and
   the first response to the first query indicates performance of the action specified by the first query.

5. The computer-implemented method of claim 4, wherein the operations further comprise:
   processing, using the summary generation module of the assistant interface, the first response and the respective topic summary to generate an updated topic summary corresponding to the particular existing topic that the first query is classified as being related to; and
   storing the updated topic summary corresponding to the particular existing topic in the topic summary datastore.

6. The computer-implemented method of claim 5, wherein storing the updated topic summary further comprises storing the first query and the first response as a respective query-response interaction in the topic summary datastore.

7. The computer-implemented method of claim 1, wherein the presentation content provided for output from the user device includes or provides access to the past query-response interactions between the user and the assistant interface that are related to the particular existing topic.

8. The computer-implemented method of claim 1, wherein processing, using the topic classification module, the first query to classify the first query as being related to the particular existing topic comprises:
 receiving or accessing a current list of existing topics that correspond to respective ones of the plurality of topic summaries stored in the topic summary datastore; and
 processing the first query conditioned on the current list of existing topics to classify the first query as being related to the particular existing topic.

9. The computer-implemented method of claim 1, wherein the assistant interface comprises:
 one or more large language models (LLMs); or
 an interface for connecting to one or more LLMs.

10. A system comprising:
 data processing hardware; and
 memory hardware in communication with the data processing hardware, the memory hardware storing instructions that when executed on the data processing hardware cause the data processing hardware to perform operations comprising:
  receiving, at an assistant interface, a second query issued by a user, the second query specifying an action for the assistant interface to perform on behalf of the user;
  processing, using a topic classification module, the second query to classify the second query as being related to a new topic not previously discussed in any previous query-response interactions between the user and the assistant interface;
  processing, using a response generation module, the second query to generate a second response to the second query;
  processing, using a summary generation module of the assistant interface, the second response to generate a respective topic summary corresponding to the new topic classified by the topic classification module;
  storing the respective topic summary corresponding to the new topic classified by the topic classification module in a topic summary datastore;
  receiving, at the assistant interface, a first query issued by the user;
  processing, using the topic classification module of the assistant interface, the first query to classify the first query as being related to a particular existing topic that corresponds to a respective one of a plurality of topic summaries stored in the topic summary datastore, each respective topic summary of the plurality of topic summaries stored in the topic summary datastore corresponding to a different respective topic and associated with a respective summary of past query-response interactions between the user and the assistant interface that are related to the different respective topic;
  retrieving, using the particular existing topic that the first query is classified as being related to, the respective topic summary from the topic summary datastore that corresponds to the particular existing topic;
  processing, using the response generation module of the assistant interface, the first query conditioned on the respective topic summary retrieved from the topic summary datastore to generate a first response to the first query; and
  providing, for output from a user device associated with the user, presentation content based on the first response to the first query,
 wherein the particular existing topic that the first query is classified as being related to comprises a new topic that the second query is classified as being related to, and
 wherein the respective topic summary retrieved from the topic summary datastore that corresponds to the particular existing topic comprises the respective topic summary corresponding to the new topic classified by the topic classification module.

11. The system of claim 10, wherein the operations further comprise:
 determining a name for the new topic that the first query is classified as being related to; and
 providing, for output from the user device, a message informing the user of the name of the new topic and that the assistant interface will store the respective topic summary in the topic summary datastore.

12. The system of claim 10, wherein:
 the first query issued by the user requests the assistant interface to recall the respective topic summary that corresponds to the particular existing topic that the first query is classified as being related to; and
 the first response to the first query comprises the respective topic summary retrieved from the topic summary datastore.

13. The system of claim 10, wherein:
 the first query issued by the user specifies an action for the assistant interface to perform on behalf of the user, the action related to the particular existing topic that the first query is classified as being related to; and
 the first response to the first query indicates performance of the action specified by the first query.

14. The system of claim 13, wherein the operations further comprise:
 processing, using the summary generation module of the assistant interface, the first response and the respective topic summary to generate an updated topic summary corresponding to the particular existing topic that the first query is classified as being related to; and
 storing the updated topic summary corresponding to the particular existing topic in the topic summary datastore.

15. The system of claim 14, wherein storing the updated topic summary further comprises storing the first query and the first response as a respective query-response interaction in the topic summary datastore.

16. The system of claim 10, wherein the presentation content provided for output from the user device includes or provides access to the past query-response interactions between the user and the assistant interface that are related to the particular existing topic.

17. The system of claim 10, wherein processing, using the topic classification module, the first query to classify the first query as being related to the particular existing topic comprises:
 receiving or accessing a current list of existing topics that correspond to respective ones of the plurality of topic summaries stored in the topic summary datastore; and
 processing the first query conditioned on the current list of existing topics to classify the first query as being related to the particular existing topic.

18. The system of claim 10, wherein the assistant interface comprises:
 one or more large language models (LLMs); or
 an interface for connecting to one or more LLMs.

* * * * *